(12) United States Patent
Kanehira et al.

(10) Patent No.: US 6,260,345 B1
(45) Date of Patent: Jul. 17, 2001

(54) SILENT CHAIN

(75) Inventors: Makoto Kanehira; Kazumasa Matsuno; Hitoshi Ohara; Shigekazu Fukuda; Hiroshi Horie; Takayuki Funamoto; Yoshihiro Kusunoki; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/593,614

(22) Filed: Jun. 13, 2000

(30) Foreign Application Priority Data

Jun. 14, 1999 (JP) .................................................. 11-166846

(51) Int. Cl.[7] .................................................. F16G 13/04
(52) U.S. Cl. ..................... 59/4; 474/215; 59/78
(58) Field of Search ..................... 474/215, 216, 474/217; 59/78, 4, 5

(56) References Cited

U.S. PATENT DOCUMENTS

| 2,067,243 | * | 1/1937 | Perry | 474/215 |
| 2,096,061 | * | 10/1937 | Perry | 474/215 |
| 2,725,755 | * | 12/1955 | Riopelle | 474/215 |
| 3,043,154 | * | 7/1962 | Karig et al. | 474/215 |
| 5,242,334 | | 9/1993 | Sugimoto et al. | 474/215 |
| 5,651,746 | * | 7/1997 | Okuda | 474/215 |

\* cited by examiner

*Primary Examiner*—David Jones
(74) *Attorney, Agent, or Firm*—Howson & Howson

(57) ABSTRACT

A silent chain includes double rocker joint pins articulately connecting together adjacent links of the chain. The double rocker joint pins are each composed of a longer pin and a shorter pin. The longer pin has a cross-sectional shape different from that of the shorter pin, and the thickness of the longer pin as measured in a direction parallel to a chain pitch line is made greater than the corresponding thickness of the shorter pin. By thus designing the longer pin relative to the shorter pin, the longer pin has a large mechanical strength sufficient to withstand not only an impact force applied when the longer pin is swaged or riveted at opposite ends thereof, but also a shear force and a bending force applied at one time to opposite end portions of the longer pin during power-transmitting operation of the chain.

3 Claims, 3 Drawing Sheets

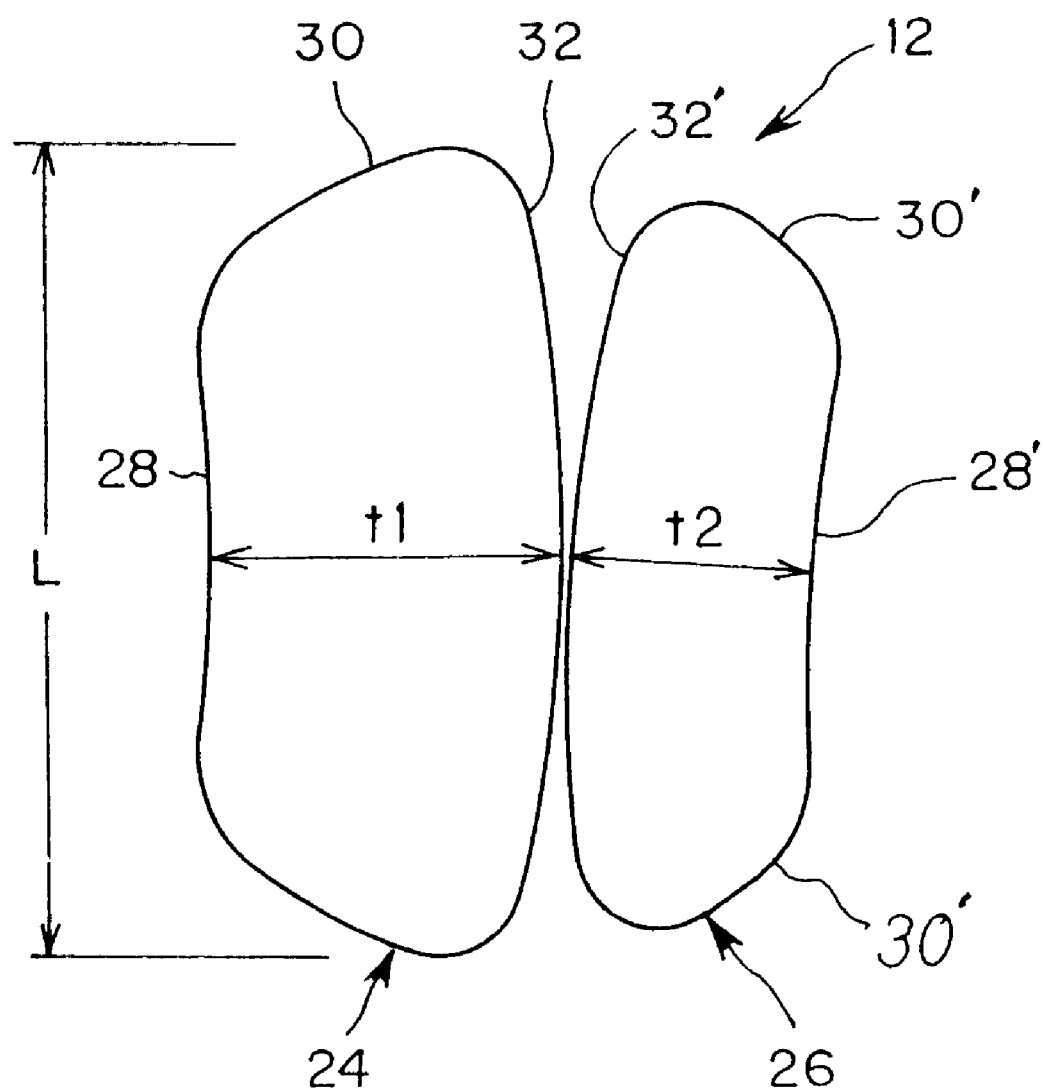

SILENT CHAIN

BACKGROUND OF THE INVENTION

1. Field of the Invention

The present invention relates generally to a silent chain including a number of link plates articulately connected by double rocker joint pins, and more particularly to a silent chain having double rocker joint pins each composed of two pins having different lengths and cross sections.

2. Description of the Related Art

Silent chains include guide links and articular links alternately arranged in the longitudinal direction of the chain and articulately connected together by pivot pins. The guide links each include a pair of laterally spaced guide plates and one or more guide link plates disposed between the guide plates. The articular links each include two or more articular link plates whose number is one more than the number of the guide link plate in each guide link. The guide plates, guide link plates and articular link plates each have a pair of pin holes at opposite ends thereof (or leading and trailing ends as viewed in the direction of movement of the silent chain). The pivot pins are inserted through the pin holes so that power can be transmitted between two adjacent links.

In one type of such silent chains, a double rocker joint pin is used as a pivot pin. The double rocker joint pin is composed of a longer pin and a shorter pin used in combination. The longer pin is located at respective leading and trailing ends of the guide plates and respective leading and trailing ends of the guide link plates, while the shorter pin is located at respective leading and trailing ends of the articular link plate.

The longer pin is fitted in two laterally aligned pin holes in the guide plates and has opposite ends projecting outwardly from the guide plates, the projecting opposite ends being swaged or riveted. The longer pin and shorter pin of each double rocker joint pin are movably received in laterally aligned pin holes of the guide and articular link plates for rocking motion relative to the link plates.

In the currently manufactured silent chains, the longer pin and the shorter pin have the same cross section, these pins of the same cross section are arranged in mirror symmetry within the same pin hole. From the viewpoint of manufacturing cost, the identical cross-sectional shape is advantageous because both pins can be manufactured by cutting off desired lengths from a single drawn wire of a certain uniform cross section. However, form the viewpoint of manufacturing process and power-transmitting operation, the longer pin and the shorter pin should preferably have different functions.

In the manufacture of the silent chain, opposite ends of the longer pins projecting outwardly from opposite outside surfaces of the guide plates are swaged or riveted. On the other hand, the shorter pin is not subjected to such swaging or riveting process. The rocker joint pin is generally elongated in shape and has a length much greater than the cross section. The longer pin has a generally semicircular cross section and hence is likely to bend when subjected to a great axial force applied during swaging of the opposite ends. Bending of the longer pin would give rise to a problem in that the overall length of the silent chain is changed and the longer pin itself may be broken during use of the silent chain.

The longer pin and shorter pin are so designed as to maintain a desired strength when they are used in combination. Accordingly, the longer pin when used alone can only provide insufficient flexural rigidity and bending strength and hence is likely to be broken. In the silent chains of the type using the rocker joint pins, only the longer pins are engaged with the guide plates. Accordingly, each longer pin is subjected to a bending force and a shear force both acting on a part of the longer pin engaged with the guide plates. Thus, during power-transmitting operation of the silent chain, the longer pin is used with more severe conditions than the shorter pin. An attempt has been made to cut down the thickness of the guide plates below the thickness of the link plates for the purpose of protecting the longer pin against undue force. However, the attempted reduction of the guide plate thickness has failed to achieve the desired purpose.

In addition, since the longer pin and the shorter pin have the same cross-sectional shape, the silent chain has a uniform pitch throughout the length thereof. This arrangement may cause a problem that secondary noise is produced due to resonance.

SUMMARY OF THE INVENTION

With the foregoing drawbacks of the prior art in view, it is an object of the present invention to provide a silent chain including structural features which can reduce loads acting on longer pins of double rocker joint pins during manufacture and power-transmitting operation of the silent chain.

To achieve the foregoing object, the present invention provides a silent chain comprising: guide links and articular links articulately connected by double rocker joint pins in an alternate fashion along the length of the chain. Each of the double rocker joint pins is composed of a longer pin and a shorter pin smaller in length than the longer pin. Each of the guide links has a pair of laterally spaced guide plates and at least one guide link plate disposed between the guide plates. Each of the articular links has at least two laterally aligned articular link plates. The guide plates each have a pair of first pin holes at opposite ends thereof, and the longer pin of each of the double rocker joint pins is fitted in each of the first pin holes. The guide link plate and each of the articular link plates have a pair of second pin holes at opposite ends thereof, and each of the double rocker joint pins composed of one pair of longer and shorter pins is inserted through each of the second pin holes. The longer pin and the shorter pin each have a different cross-sectional shape, and a thickness of the longer pin as measured in a direction parallel to a pitch line of the chain is greater than that of the shorter pin.

The longer pin preferably has a cross-sectional area greater than that of said shorter pin. It is preferable that the difference in thickness between the longer pin and the shorter pin in the chain pitch line direction is in the range of from about 0.3 to about 5% of a pitch of the silent chain.

The double rocker joint pins of the silent chain are fitted in the first and second pin holes of the plates in such a manner that the longer and shorter pins are rockably received in pair within the second pin holes of the link plates. Considering that only the longer pins are subjected to a swaging or riveting process during the manufacture of the silent chain, the cross-sectional shape of the longer pins is made different from that of the shorter pins, and the thickness of the longer pins in the direction of a pitch line of the silent chain is made greater than that of the shorter pins, whereby the cross-sectional area of the longer pins is made larger than that of the shorter pins. By thus arranging the double rocker joint pins, the longer pins are protected from becoming bent when subjected to an axial impact force during the swaging or riveting process.

During power-transmitting operation of the silent chain, the longer pins are subjected to a bending force because opposite end portions thereof are secured to the guide plates forming a cantilever. The opposite end portions of the longer pins are also subjected to a shear force in the same manner as the shorter pins. The bending force acts in the direction of the pitch line of the silent chain. According to the present invention, the thickness of the longer pins as measured in the direction of the chain pitch line is made greater than that of the shorter pins, so that the longer pins are able to withstand severe operating conditions than those of the shorter pins. Thus, the overall lifetime of the silent chain can be lengthened.

BRIEF DESCRIPTION OF THE DRAWINGS

A certain preferred embodiment of the present invention will now be described in detail, by way of example only, with reference to the accompanying drawings, in which:

FIG. 4 is an enlarged end view of the double rocker joint pin.

DETAILED DESCRIPTION OF THE PREFERRED EMBODIMENT

The following description is merely exemplary in nature and is in no way intended to limit the invention or its application or uses.

Figure 1:
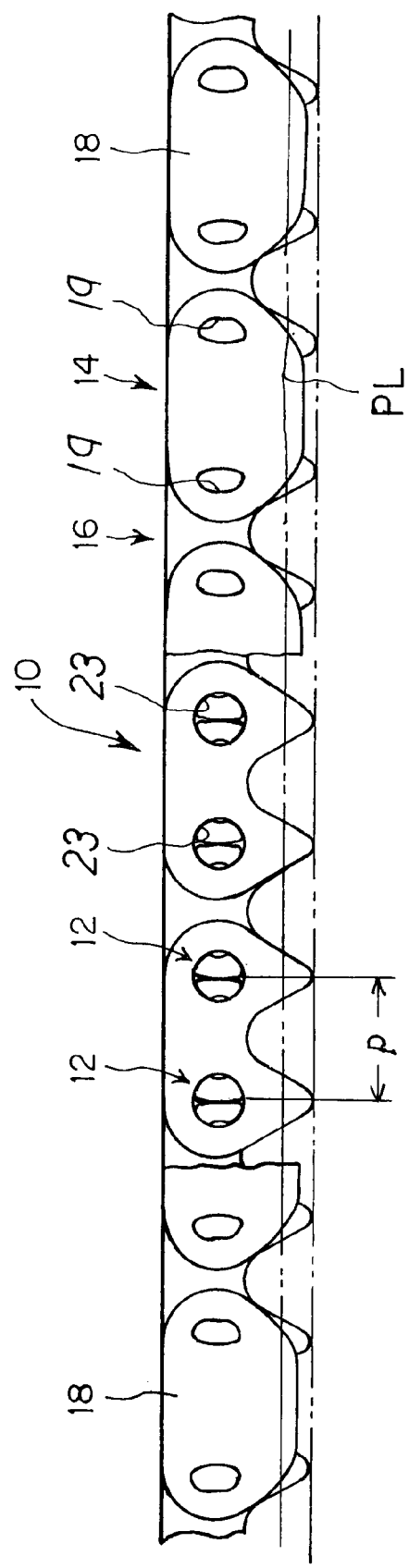
FIG. 1 is a fragmentary side view, with parts cut away for clarity, of a silent chain according to an embodiment of the present invention.
Figure 2:
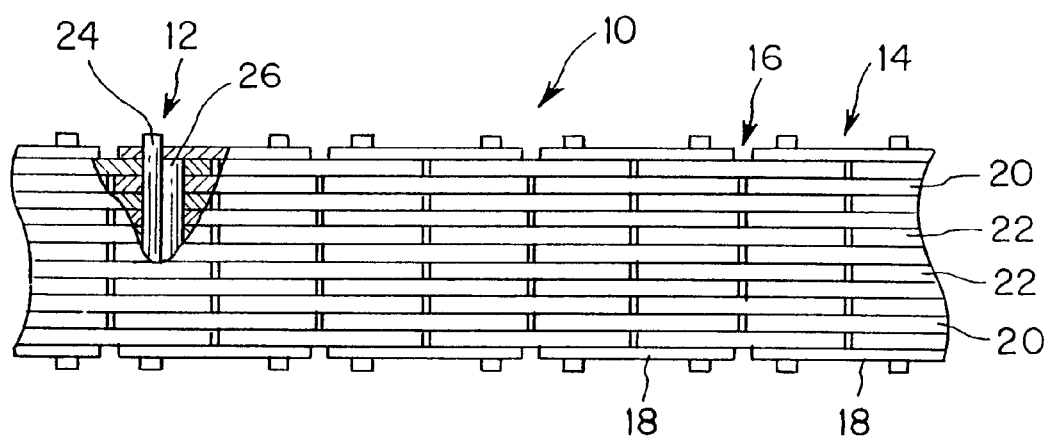
FIG. 2 is a top plan view, with parts in cross section, of the silent chain.

Referring now to the drawings and FIGS. 1 and 2 in particular, there is shown a silent chain 10 according to an embodiment of the present invention. The silent chain 10 includes guide links 14 and articular links 16 alternately arranged in the longitudinal direction of the silent chain 10. The guide links 14 and the articular links 16 are articularly connected together in an endless fashion by means of double rocker joint pins 12.

Each of the guide links 14 has a pair of laterally spaced guide plates 18 and one or more guide link plates 20 disposed between the guide plates 18. When the silent chain 10 is used in combination with a sprocket (not shown), the guide plates 18 are located on opposite sides of the sprocket so as to prevent the silent chain from being displaced off the sprocket. Each of the articular links 16 has two or more laterally aligned articular link plates 22 the number of which is one more than the number of the guide link plates 20. In each adjacent pair of guide and articular links 14, 16, the guide link plates 20 and the articular link plates 22 are interleaved or overlapped side-by-side. The guide plates 18 each have a pair of first pin holes 19 (FIG. 1) at opposite ends thereof. The guide link plates 20 and articular link plates 22 each have a pair of second pin holes 23 (FIG. 1) at opposite ends thereof. The rocker joint pins 12 are inserted through the first and second pin holes 19, 23, thereby interconnecting the adjacent links 14, 16.

Figure 3:
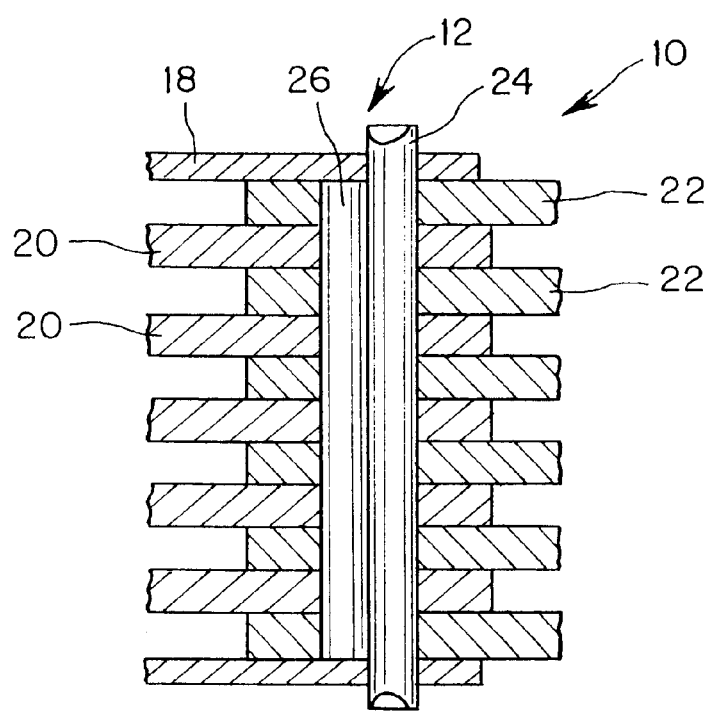
FIG. 3 is a cross-sectional view showing one double rocker join pin of a part of the silent chain.

As shown in FIG. 3, each of the double rocker joint pins 12 is composed of a longer pin 24 and a shorter pin 26 which is smaller in length than the longer pin 24. The shorter pin 26 is inserted through each of the second pin holes 23 of the guide and articular link plates 20, 22. The longer pin 24 is inserted through each of the second pin holes 19 of the guide and articular link plates 20, 22 and also fitted in each of the first pin holes 19 of the guide plates 18. The longer pin 24 has opposite ends projecting outwardly from opposite outside surfaces of the guide plates 18, the projecting opposite ends being swaged or riveted so that the longer pin 24 is prevented from being displaced off the guide plates 18.

The first pin holes 19 have a shape complementary in contour to a cross-sectional shape of the longer pin 24. The second pin holes 23 are designed such that one pair of longer and shorter pins 24 and 26 is received for rocking motion within each second pin hole 23.

As shown in FIG. 4, the longer pins 24 has an arcuately concave seating surface 28, a pair of arcuately convex shoulder surfaces 30 contiguous with opposite ends of the seating surface 28, and an arcuately convex rolling surface 32 inter-connecting one end of the shoulder surfaces 30 at a side opposite from the seating surface 28. Similarly, the shorter pin 26 has an arcuately concave seating surface 28', a pair of arcuately convex shoulder surfaces 30' contiguous with opposite ends of the seating surface 28', and an arcuately convex rolling surface 32' inter-connecting one end of the shoulder surfaces 30' at a side opposite from the seating surface 28'. The longer pin 24 and the shorter pin 26 each have a different cross-sectional shape so that the longer pin 24 has mechanical properties superior to the mechanical properties of the shorter pin 26.

The seating surface 28 of the longer pin 24 and the seating surface 28' of the shorter pin 26 are in mirror symmetry with each other. The shoulder surface 30 of the longer pin 24 is longer than the shoulder surface 30' of the shorter pin 26. The rolling surface 32 of the longer pin 24 is in mirror symmetry with the rolling surface 32' of the shorter pin 26. As is achieved in many silent chains, the seating surfaces 28, 28' and the rolling surfaces 32, 32' may be constructed into asymmetrical configurations in view of the functions required for the silent chain. According to the present invention, the shoulder surfaces 30 of the longer pin 24 are made longer than those 30' of the shorter pin 26 so that when the silent chain 10 is in the rectilinear state, the thickness t1 of the longer pin 24 as measured in a direction parallel to a pitch line PL (FIG. 1) of the chain 10 becomes greater than the corresponding thickness t2 of the shorter pin 26. By thus designing the double rocker joint pins 12, the longer pin 24 has a cross-sectional area greater than that of the shorter pin 26. The longer pin 24 and shorter pin 26 are each produced by cutting a continuous drawn wire of uniform cross section into desired lengths. More specifically, in the manufacture of the longer pin, a drawn wire having a first cross-sectional shape is used, whereas a drawn wire having a second cross-sectional shape is used in the manufacture of the shorter pin 26.

The longer pin 24 and shorter pin are constructed to have different cross-sectional shapes so that within an area defined by the perimeter of the second pin hole 23, the cross-sectional area of the longer pin 24 is made larger than that of the shorter pin 26. By thus enlarging the cross-sectional area, the longer pin 24 is able to withstand an impact force applied when the opposite ends of the longer pin 24 are swaged or riveted.

Since the opposite end portions of the longer pin 24 are fitted with the guide plates 18 at an exterior side of the opposite outside link plates 20 of each guide link 14, the longer pin 24 forms a cantilever at each end portion thereof. The cantilevered end portion of the longer pin 24 is subjected to both a shear force and a bending force at one time. However, according to the invention, partly because the longer pin 24 has a large sectional area than the shorter pin 24, and partly because the thickness of the longer pin 24 as measured in a direction parallel to the chain pitch line PL (FIG. 1) is made greater than that of the shorter pin 26, the section modulus of the longer pin 24 is larger than the shorter pin 26. This means that the longer pin 24 is able to withstand more severe working conditions than those of the shorter pin 26.

FIG. 4 shows in exaggerated manner the difference between the thickness t1 of the longer pin 24 (as measured in the direction of the chain pitch line PL shown in FIG. 1) and the corresponding thickness t2 of the shorter pin 26. The thickness difference is preferably in the range of from 0.03 mm to 0.5 mm when the chain pitch P (FIG. 1) is 9.525 mm. This thickness difference is equivalent to a range of from about 0.3 to about 5% (to be more precise, from 0.31 to 5.2%) of the chain pitch P.

For comparative purposes, a conventional double rocker joint pin composed of a pair of longer and shorter pins of identical cross section having a thickness of 1.80 mm in the chain pitch line direction, and an inventive double rocker joint pin composed of a longer pin having a thickness t1 of 2.05 mm and a shorter pin having a thickness t2 of 1.55 mm were tested for the bending strength and flexural rigidity with the results indicating that an about 30% increase in the bending strength and an about 45% increase in the flexural rigidity were achieved by the inventive double rocker joint pin. In addition, since the length L (FIG. 4) of the longer pin 24 as measured in the direction of the height of the link plates 20, 22 is greater than that of the shorter pin 26, the cross-sectional area of the longer pin 24 is further increased. This may add considerably to the bending strength and flexural rigidity o the longer pin 24.

If the difference between the thickness t1 of the longer pin 24 and the thickness t2 of the shorter pin 26 is less than 0.31% of the pitch P (FIG. 1) of the silent chain, an extended lifetime of the silent chain cannot be expected partly because the longer pin 24 is insufficiently protected against bending when swaged or riveted at opposite, and partly because the shear strength and flexural rigidity of the longer pin 24 are substantially the same as those of the longer pin of the conventional silent chain. Conversely, if the thickness difference between the longer pin 24 and the shorter pin 26 is greater than 5.2% of the chain pitch P (FIG. 1), an excessive deviation would occur between the pitch of guide links 14 and the pitch of the articular links 16, resulting in deteriorated meshing engagement between the silent chain and a sprocket not shown.

According to the present invention, the longer pins 24 and the shorter pins 26 have different thicknesses, so that the pitch of the guide links 14 becomes smaller than the pitch of the articular links 16. The guide links 14 and the articular links 16 arranged alternately at different pitches along the length of the silent chain can suppress periodic sounds generated when the silent chain comes into meshing engagement with teeth of the sprocket not shown. Thus, use of a pair of longer and shorter pins 24 and 26 of different cross sections enables the silent chain 10 to provide an enhanced noise reduction effect as compared to the conventional silent chain having a pair of longer and shorter pins of identical cross section.

It can readily be appreciated that a longer pin and a shorter pin inserted in pair through pin holes of laterally overlapping link plates are constructed to have different cross-sectional shapes. On consideration of a load or force acting on the longer pin when swaging or riveting opposite ends of the longer pin and a load or force acting on the longer pin during power-transmitting operation of the silent chain, the thickness of the longer pin as measured in a direction parallel to a pitch line of the silent chain is made greater than the corresponding thickness of the shorter pin. The longer pin can, therefore, withstand both an impact force acting in the axial direction of the double rocker joint pin when the associated longer pin is swaged or riveted at opposite ends, and a shear force and a bending force applied during power-transmitting operation of the silent chain. The silent chain having such double rocker joint pin eventually has a prolonged lifetime.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain having a pitch line extending in the longitudinal direction thereof, comprising:

guide links and articular links articulately connected by double rocker joint pins in an alternate fashion along the length of said chain, each of said double rocker joint pins being composed of a longer pin and a shorter pin smaller in length than said longer pin;

each of said guide links having a pair of laterally spaced guide plates and at least one guide link plate disposed between said guide plates;

each of said articular links having at least two laterally aligned articular link plates;

said guide plates each having a pair of first pin holes at opposite ends thereof, said longer pin of each of said double rocker joint pins being fitted in each of said first pin holes; and said guide plate and each of said articular link plates having a pair of second pin holes at opposite ends thereof, each of said double rocker joint pins composed of said longer and shorter pins being inserted through each of said second pin holes, wherein said longer pin and said shorter pin each have an arcuately concave seating surface, a pair of arcuately convex shoulder surfaces contiguous with opposite ends of said seating surface, and an arcuately convex rolling surface interconnececting one end of said shoulder surfaces at a side opposite from said seating surface, said seating surface of the longer pin and said seating surface of the shorter pin are in mirror symmetry with each other, said rolling surface of the longer pin and said rolling surface of the shorter pin are in mirror symmetry with each other and are in rolling contact with each other, said shoulder surfaces of the longer pin are longer than said shoulder surfaces of the shorter pin, said longer pin and said shorter pin each have a different cross-sectional shape, and a thickness of said longer pin as measured in a direction parallel to the pitch line of said chain is greater than that of said shorter pin.

2. A silent chain according to claim 1, wherein said longer pin has a cross-sectional area larger than that of said shorter pin.

3. A silent chain according to claim 1, wherein said chain has a chain pitch, and the difference in thickness between said longer pin and said shorter pin in said direction is in the range of from abut 0.3 to about 5% of said chain pitch.

* * * * *